United States Patent [19]

Tisse et al.

[11] Patent Number: 5,054,355

[45] Date of Patent: Oct. 8, 1991

[54] AUTOMATIC GLASS CUTTING AND POSITIONING SYSTEM

[75] Inventors: Thor R. Tisse, Salisbury, N.C.; Ricky J. Turner, Clover, S.C.

[73] Assignee: Guardian Industries Corp., Northville, Mich.

[21] Appl. No.: 492,766

[22] Filed: Mar. 13, 1990

[51] Int. Cl.$^5$ .................. B26D 3/08; C03B 33/10
[52] U.S. Cl. ............................ 83/879; 83/884; 83/425.4; 83/508.3
[58] Field of Search ............ 83/76.6, 76.9, 425.4, 83/508.3, 879, 880, 883, 884, 886, 887; 225/2, 3, 96.5

[56] References Cited

U.S. PATENT DOCUMENTS

| | | | |
|---|---|---|---|
| 3,515,020 | 6/1970 | Dryon | 83/884 |
| 3,690,527 | 9/1972 | Bustraan et al. | 225/4 |
| 3,698,170 | 10/1972 | Gouttierre | 83/883 |
| 3,754,884 | 8/1973 | McDavid et al. | 65/97 |
| 3,779,437 | 12/1973 | Yamamoto et al. | 225/96.5 |
| 3,812,748 | 5/1974 | Nausbaum . | |
| 3,834,258 | 9/1974 | Zumstein | 83/884 |
| 4,072,887 | 2/1978 | Buschmann et al. | 83/884 X |
| 4,137,803 | 2/1979 | Goldinger | 83/881 |
| 4,170,159 | 10/1979 | McNally | 83/883 X |
| 4,513,649 | 4/1985 | Dricot | 83/883 |
| 4,570,518 | 2/1986 | Burmeister et al. | 83/508.34 |
| 4,604,934 | 8/1986 | Elliott et al. | 83/880 |
| 4,698,088 | 10/1987 | Bando | 65/174 |
| 4,736,661 | 4/1988 | Shirai | 83/882 |
| 4,743,284 | 5/1988 | Mouly et al. | 65/113 |

OTHER PUBLICATIONS

Product Brochure for the Tidland Corporations "ESP", Electronic Slitter Positioning System, undated.

Primary Examiner—Mark Rosenbaum
Assistant Examiner—Eugenia A. Jones
Attorney, Agent, or Firm—Myers, Rose & Liniak

[57] ABSTRACT

An apparatus for cutting glass produced in a continuous flow process is disclosed. The apparatus includes a cutting and/or scoring means, a linear step motor means, a rail means, an actuator for elevating a cutting and/or scoring means, and a control means. The apparatus will position the cutting means accurately and quickly, because the linear step motor is utilized and, thus, the amount of cullet will be reduced.

12 Claims, 4 Drawing Sheets

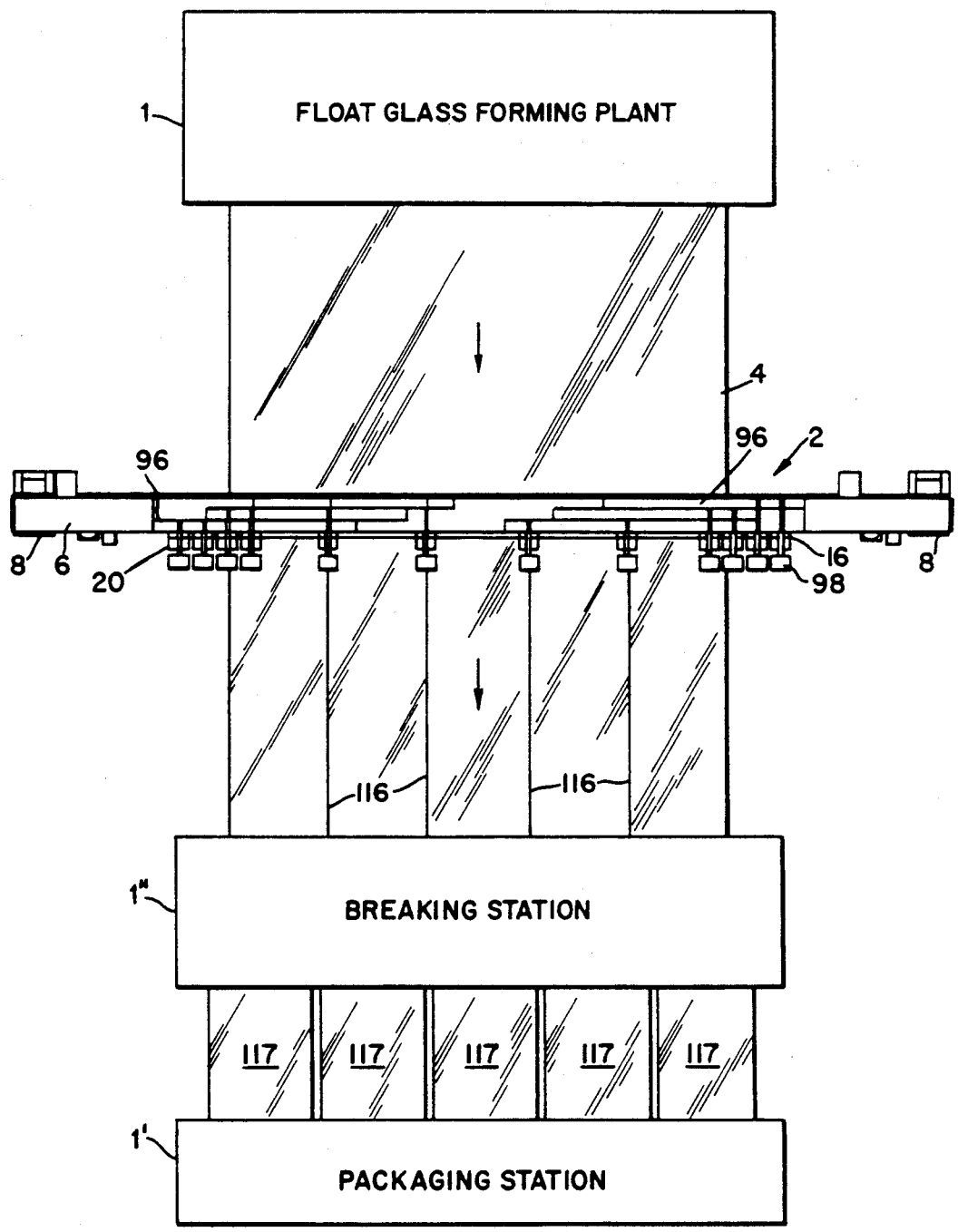

AUTOMATIC GLASS CUTTING AND POSITIONING SYSTEM

BACKGROUND OF THE INVENTION

1. Field of the Invention

This invention relates to an automatic positioning and cutting system for use in a float glass production plant and, more particularly, to a system employing a linear stepper motor for automatically positioning a plurality of glass cutting carriages along a bridge which extends transversely across the glass as it exits the forming equipment of the production plant such that the glass can be continuously cut without undue interruptions.

Glass cutting equipment according to this invention provides a more reliable and more accurate means of automatically positioning the glass cutting carriages than previously achieved in prior art systems. In a preferred embodiment, a controller and a linear stepper motor are attached to one side of a carriage to position the carriage, while cutting means are attached to the other side of the carriage to cut the glass material.

2. Description of the Prior Art

To continuously produce flat glass by the "float glass" process, various powdered raw materials, are mixed together and melted in a furnace. This mixture is poured onto the surface of a molten tin or tin alloy bath. The mixture is then passed over the bath to form a sheet of glass. As the semi-molten sheet traverses the length of the bath, it spreads out across the surface area of the bath to form a sheet of glass having plane parallel surfaces and a finite width. The sheet is then allowed to solidify as it progresses along the ever-cooling bath. The solidified glass sheet leaves the tin bath, and is annealed to remove substantially all internal stresses. Cutting to desired lengths and widths is now done. Conventionally the sheet is continuously conveyed to a cutting operation where it is scored longitudinally and then perpendicularly to the direction of travel of the sheet and thereafter broken at the score lines to form panes of the desired dimensions. These panes of predetermined sizes are then conveyed to stations for packaging and shipment.

The present invention relates to improvements in the automation of the first (i.e. longitudinal) scoring step, and represents a significant advance in the art from the point of view of productivity. In order to better understand the significance of this advance, the prior art's problems must be first described.

In general they are as follows: as mentioned earlier, after leaving the float glass forming and annealing apparatus, the cooled glass must be cut (scored) longitudinally an perpendicularly to the direction of travel of the glass sheet to form panes of various predetermined sizes. On average, most plants produce hundreds of tons of glass per day. Clearly, therefore, the cutter (scorer) must be as continuously operated as possible in order to avoid undue waste, and must provide rapid adjustment so that orders for glass panes of different sizes may be filled. When continuity is not achieved, glass not being cut, because, for example, time-consuming adjustments are being made, must be turned into cullet and recycled.

In one prior art cutting method widely employed throughout the float glass industry, the longitudinal or first cut is usually performed by scoring machines having cutters supported by a bridge which extends transversely across and above the sheet of glass such that the cutters can cut the glass longitudinally as the glass moves past the cutters. In order to position the carriage so that the pane size can be varied, several different cutting machines must be utilized because of the continuous glass forming process. In such prior art processes, at any particular time, glass is being cut by cutters on one machine, to accommodate one set of requirements, while cutters on another different machine are being adjusted to accommodate the next order. The setup process, whereby the cutters are reset to accommodate the next order, is inexact, so that the actual widths of the glass strips cut must be measured, and the precise position of the cutters, commonly, are readjusted. The glass cut during the adjustment process obviously cannot be sold and must be turned to cullet. While this recycling to "cullet" is helpful, the output of the production plant is wasted during this time.

It is apparent that this method of cutting glass creates an undesirable abundance of cullet and is time-consuming. Consequently, it would be most desirable to be able to automatically position the cutters to accommodate these varying sizes as quickly and as accurately as possible in order to avoid the rechecking steps.

Exemplary of various prior art attempts to provide semiautomatic cutting systems are the well-known screw-type systems which make use of carriages and the aforementioned plurality of bridges. Alternatively, the systems disclosed in U.S. Pat. Nos. 4,072,887 to Buschmann et al. and 4,170,159 to McNally employ rotary stepper motors and a hybrid system, respectively. Also, a cutting apparatus for moving a cutter head "on the fly" across a piece of glass while employing a linear stepper motor is known, as shown by the parker Hannifin Corporation, Compumotor Division Catalog, 1988. None of these systems achieve true automatic positioning of cutters to accommodate longitudinal scoring (cutting) of glass as it advances off a continuous glass sheet forming operation such as from the float glass process.

Screw type cutting systems, exemplified by the well known Grenzebach screw cutter, generally employ a central screw upon which the cutter carriages are located. In order to maintain the integrity of the system, the screw must be connected to a large beam which serves as the cutter bridge. When it is desired to move the cutter carriages, the screw is rotated causing the carriages to traverse the length of the screw. The carriages are independently positioned with respect to one another using various cumbersome brakes and clutches which interact with the screw. The disadvantages of the screw system are numerous: a low degree of accuracy (plus or minus 0.04 in.), due to the mechanical tolerances between the screw and the brakes and clutches; extended periods of time required to position the carriages and return them to a home position (approximately three minutes required for all carriages to return home); inability to quickly repair and replace a carriage and the screw (approximately eight hours required to replace a screw); high cost; excessive weight of the system due to the large carriages and the massive screw; and the limited number of cutting heads.

Operationally, the most significant problem with the screw system is excessive cullet generated because several pieces of glass must be cut on a trial and error basis each time the carriages are repositioned in order to insure accurate positioning. As this trial and error repositioning step is commonly performed numerous times during the day, the amount of cullet produced can become enormous. Therefore, it would be advantageous to use a glass cutting system that is accurate, quick and avoids the undesirable problems associated with the Grenzebach screw.

The U.S. Pat. No. 4,072,887 to Buschmann et al. discloses a positioning apparatus for cutters in which the carriages are positioned through the use of individually operated rotary stepper motors and controlled by a common controller unit. Positioning of the carriages centers around the positioning of the carriage closest to the home position, and the subsequent positioning of the remaining carriages, with respect to the aforementioned carriage closest to the home position. Unfortunately, rotary stepper motors used this way have some significant disadvantages; namely, mechanical tolerances between the toothed rack and the pinion reduce the positioning accuracy of the device and the inability to quickly repair and replace a cutter.

In U.S. Pat. No. 4,170,159 to McNally, there is disclosed a linear positioning apparatus comprised of cutters attached to carriages, such that the carriages are positioned by a central control means and screw drive mechanism. A motor rotates the screw drive mechanism but the type of motor employed is not disclosed. This apparatus suffers from several problems; for example, the tolerances between the carriages and the screw will affect the accuracy of the system. Moreover, the carriages cannot be replaced or repaired quickly.

While these prior art systems are capable of positioning the carriages, they cannot rapidly position the carriages and return the carriages to a home position, due to the type of positioning means employed. Also, as stated with respect to the Grenzebach screw system, several different cutting machines must be employed in order to semi-continuously cut the glass, as the glass continually leaves the glass forming apparatus. The required switching between the machines results in excess cullet while the necessary adjustments are being made. For example, commonly, 3-15 minutes are required for the necessary adjustments. Consequently, while the glass forming apparatus is continuously producing glass for 3-15 minutes, this newly formed glass is not being cut. Instead, this newly formed glass is being turned into cullet. Also, the individual rotary step motors, as taught in Buschmann, et al., do not achieve the optimum accuracy and speed of a linear stepper motor. Finally, these cutters cannot be manually positioned quickly and easily which may become critical if the drive mechanism of the machinery malfunctions.

The flying cutter for cutting various materials disclosed in the Parker Hannifin catalog employs such a linear stepper motor and has several advantages. However in this catalog such motors are used, for example, to cut glass, "on the fly" and only perpendicularly to the direction of travel of the material. In this prior art device, the cutter traverses along the bridge as the cutter makes the perpendicular cut on the fly. The cutter is comprised of a linear stepper motor, a knife, a rail, and a carriage. While this system is highly advantageous, due to the application of the linear step motor, nowhere is it taught or disclosed how to use such motors to accurately position multiple cutters in a stationary position for consistently cutting glass in the longitudinal direction with respect to the continuous movement of the glass, as it emerges, for example, from a float glass operation. It was left to our invention to solve this problem.

While a linear stepper motor is highly advantageous, the inventors have discovered that the required air gap in the linear stepper motor was not being maintained when any appreciable load was applied, thus deterring its use in a continuous longitudinal operation. This is because a linear stepper motor is comprised of a platen and a forcer. The forcer ideally traverses along the platen on a uniform air gap at 0.0005 in. The forcer is connected to a carriage that supports a cutter. The carriage is supported by a rail. As the forcer traverses along the platen, the carriage traverses along the rail. The rail does not contain the same mechanical tolerances as the motor; consequently, there is undesirable play between the rail and the carriage. The inventors determined that this undesirable play resulted in the forcer binding against the platen. Consequently, the cutter could not be automatically or manually positioned with consistency, thus as aforesaid, deterring its use in a continuous longitudinal operation.

It is apparent, from the above, that there exists a need in the art for a float glass cutting and positioning system which rapidly positions the carriages for the longitudinal scoring thereby reducing cullet during production changeover to a different pane of glass size in a continuous glassmaking operation, and which at least equals the durability of the known systems, but which, at the same time overcomes the problems in the prior art devices.

It is a purpose of this invention to fulfill this and other needs in the art in a manner more apparent to the skilled artisan, once given the following disclosure.

SUMMARY OF THE INVENTION

This invention fulfills these needs by providing a positioning apparatus for use in cutting glass produced in a continuous float glass process comprising a base plate with first and second sides; a rail means rigidly attached to said first side of said base plate, a first carriage means secured to said rail means such that said carriage slides on said rail means; a second carriage means with first and second sides rigidly attached to said first carriage means; a linear stepper motor means comprising a linear platen, a forcer and an air gap therebetween, said motor means being rigidly attached to said first side of said base plate, such that said motor means is located adjacent to said rail means and said platen is rigidly attached to said base plate; a leveling means connected to said second carriage means and said forcer such that said leveling means interacts with said motor means thereby to provide a uniform air gap between said platen and said forcer; and a cutting means removable attached to said second carriage means.

Many of the problems experienced by the prior art devices as above-described are overcome or greatly mitigated by the subject invention. First, this invention can accurately position the cutters in a stationary position. Second, this invention can maintain the required uniform air gap of 0.0005 in. across the interface between the forcer and the platen, through the use of a unique leveling device, rather than allowing the forcer to pivot and bind against the platen. Third, this invention can increase the daily amount of glass that may be cut by up to one percent or more. Fourth, the carriages may be returned home very rapidly, often within approximately twenty seconds or less as opposed to several minutes in conventional, prior art techniques. Fifth, a carriage itself may be replaced very rapidly, often within about five minutes as opposed to typical prior art times of eight hours. Sixth, the carriages may be positioned extremely accurately, e.g., within 0.001 in. Seventh, more cutters (up to twelve cutting heads) may be added to a single cutter bridge if desired in order to fill customer orders quicker. Finally, only one cutter bridge is necessary as opposed to certain prior art devices necessitating multiple cutter bridges for commercial operability. However, it is to be understood that multiple bridges may be used in this invention as backups which further reduce downtime if a shutdown of the primary bridge becomes necessary.

Certain preferred systems, according to this invention, offer the following advantages: light weight construction; easy assembly, repair and replacement; smooth linear motion; good stability; good durability; quick and accurate linear positioning; good economy; and high strength for safety. In fact, in many of the preferred embodiments, these factors of easy assembly, repair and replacement, linear motion, and quick and accurate linear positioning are optimized to an extent considerably higher than heretofore achieved in prior, known positioning systems.

BRIEF DESCRIPTION OF THE DRAWINGS

FIG. 5 is a schematic plan view of a complete system for continuously forming, cutting, and packaging glass according to the invention.

DETAILED DESCRIPTION OF THE INVENTION

Figure 1:
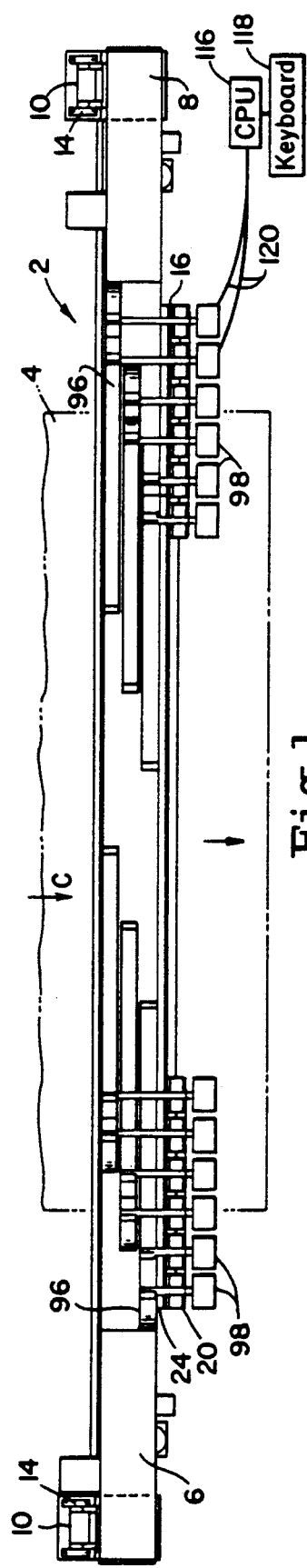
FIG. 1 is a top view of a positioning and cutting system according to the present invention.
Figure 2:
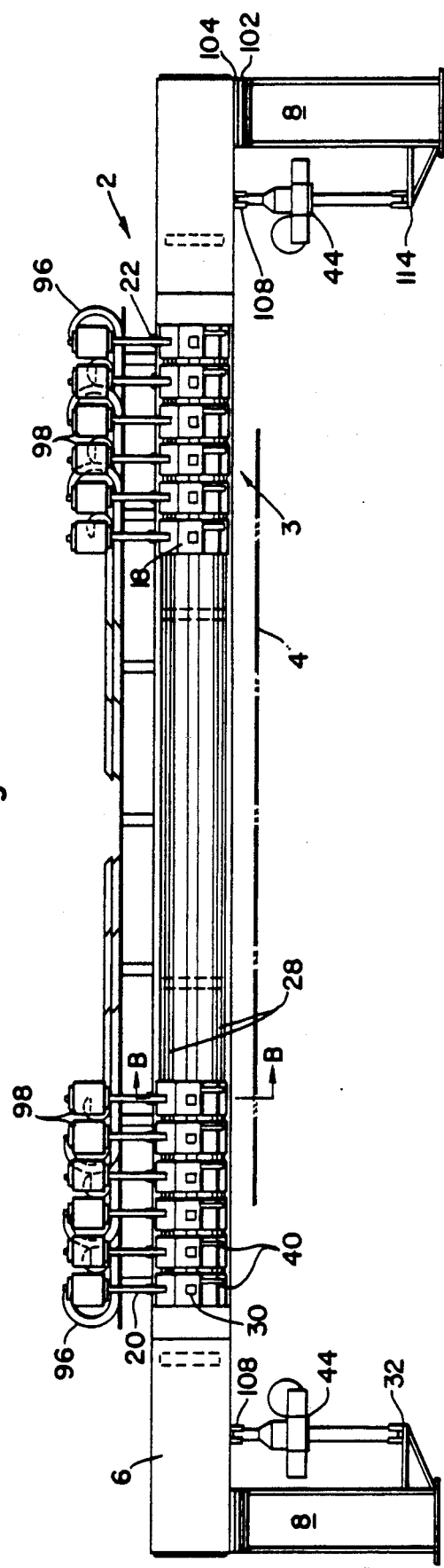
FIG. 2 is a front view of the positioning and cutting system according to the present invention.

With reference to FIGS. 1, 2, and 5, there is illustrated an advantageous environment for use of this invention, for cutting glass produced in a continuous float process. As shown more clearly in FIG. 5, float glass 4 is continuously formed in the float glass plant 1, and is fed to positioning and cutting apparatus 2 where cutting apparatus 2 makes cuts 116 in glass 4. The cut glass is broken in breaking station 1″ where the glass is separated into plates 117 and then packaged for shipment at a packaging station 1′.

Figure 3:
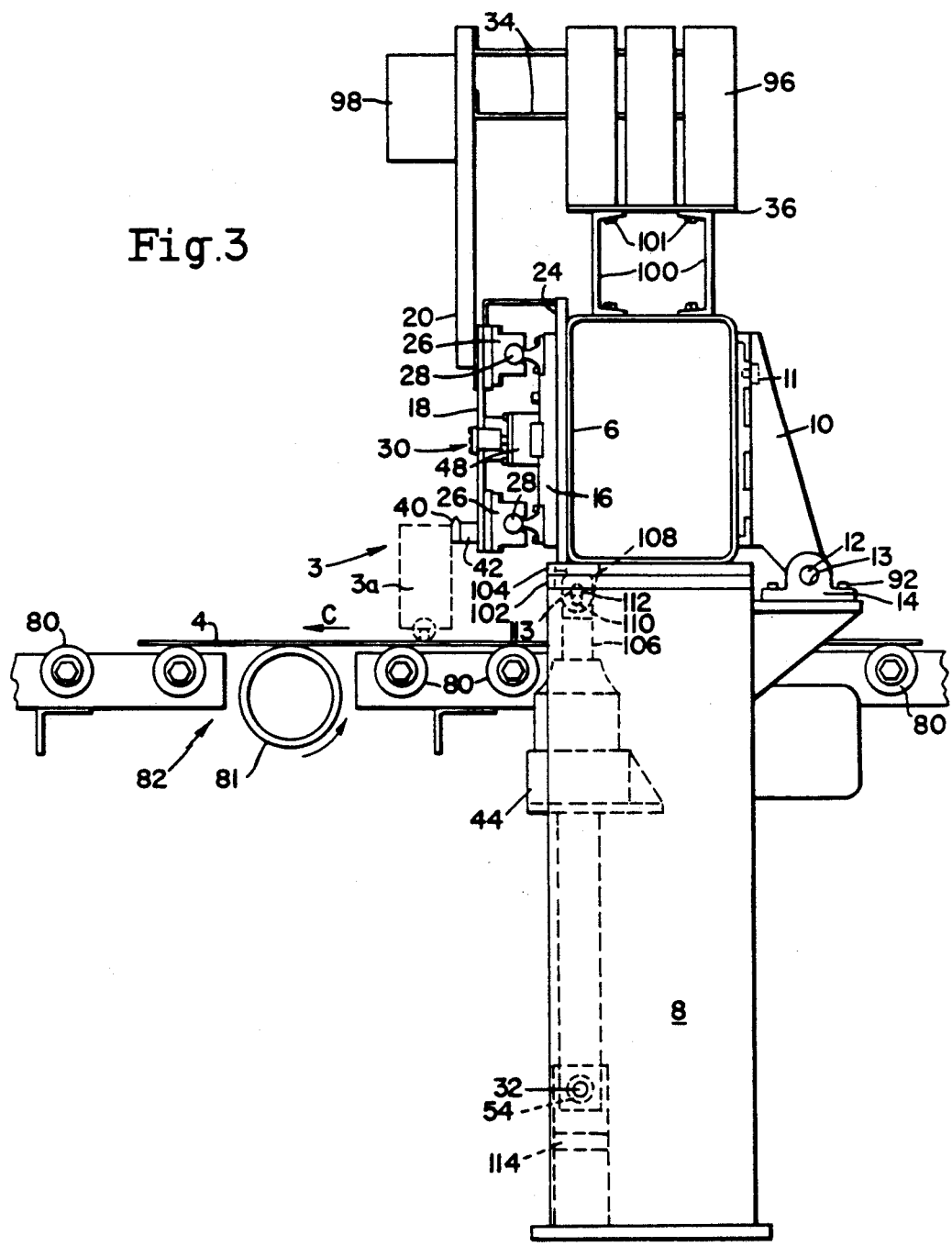
FIG. 3 is an end view of the positioning and cutting system according to the present invention.

As shown in FIGS. 1–3, the cutting apparatus 2 comprises a support beam 6 which is supported by support beam legs 8 transversely across the path of glass 4. A plurality of glass cutters 3 are carried on support beam 6 and move transversely across beam 6 to the relative positions of cuts 116.

Plate 104 is rigidly secured to the bottom of beam 6, preferably by welding. Plate 102 is rigidly secured to the top of leg 8, preferably by welding; thereafter, plate 104 simply sits on plate 102. Also, provided on cutters 3 are cable tracks 96 and proximity switches 22.

While any one of the many well known glass cutting devices 3a may be used, in certain preferred embodiments, we have found that a Grenzebach electropneumatic cutting head glass cutter or similar such glass cutter may be conveniently used to achieve an acceptable cut in the practice of this invention.

Figure 4:
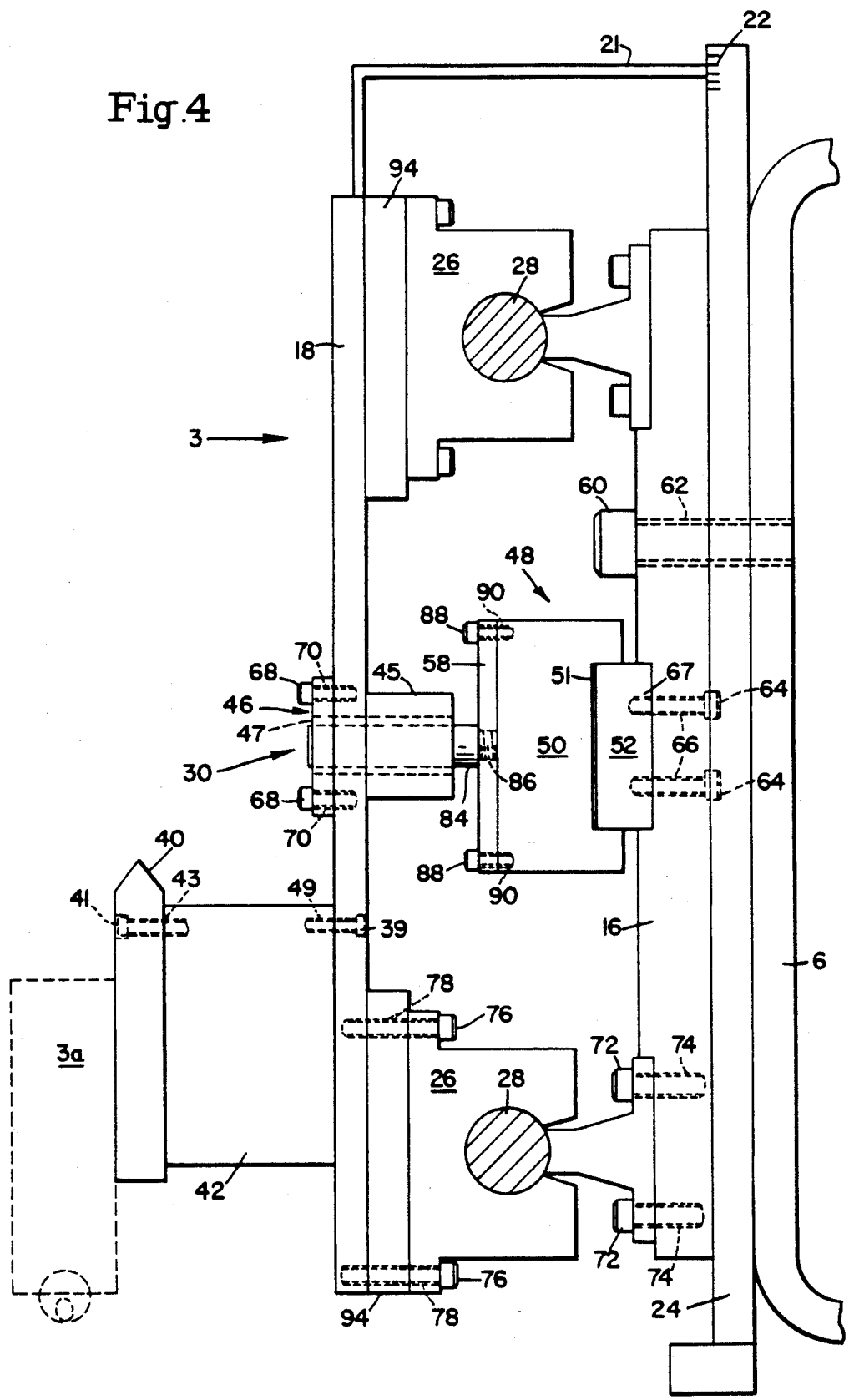
FIG. 4 is a cross sectional view of an embodiment of the apparatus of the present invention taken along line B—B of FIG. 2.

As shown in FIGS. 3–4, cutters 3a are attached to beam 6 through shim 24, preferably by welding. Base plate 16, which may be machined to provide substantially flat parallel sides, is secured to threaded hole 62, in shim 24, by bolt fastener 60. Linear stepper motor 48 is comprised of forcer 50 and platen 52; forcer 50 is placed on platen 52 and rides along platen 52, on air gap 51, which is preferably 0.0005 in. The preferred forcers 50 are Compumotor L20, while the preferred platen 52 is a Compumotor PO-L20-P180. Platen 52 is secured to holes 66, in base plate 16, by fastener bolts 64 such that bolts 64 are threaded into holes 67 in platen 52. Forcer plate 58 is secured to threaded holes 90, in forcer 50, by bolt fastener 88. Forcer plate 58 must be substantially parallel to base plate 16.

Linear bearings 26 and linear rails 28 are located on both sides of motor 48. The preferred linear bearings 26 are conventional Thompson surface mount twin open bearings (TWN-16-OPN), while the preferred linear rail 28 is a conventional Thompson Straight rail. Rails 28 are secured to threaded holes 74, in base plate 16, by bolt fasteners 72. Rails 28 are aligned to be substantially parallel with platen 52 the entire length of base plate 16. Any shift from this desired parallelism will cause forcer 50 to contact platen 52, and motor 48 will not operate. Spacer plates 94 and carriage plate 18 are secured to linear bearings 26 by fastening bolts 76.

Flange bearing 30 is secured to plate 18 between spacer plates 94. Flange bearing 30 includes pillow block 46 and rod 84. The preferred block 46 is a Thompson SFB-8 comprising a metal sleeve 45 and a rubber insert which is not numbered because the rubber insert has been removed, and an XA81420 metal linear ball bushing 47 has been installed in its place. Rod 84 is threaded at one end, and is secured to threaded hole 86 in forcer plate 58. Block 46 is secured to threaded holes 70, in carriage plate 18, by bolt fasteners 68. Flange bearing 30 provides the aforementioned unique leveling feature of this invention which will now be described.

Forcer plate 58 is secured to forcer 50, such that forcer plate 58 is substantially parallel to base plate 16. Pillow block 46, which has been modified with the aforementioned ball bushing 47, is secured to carriage plate 18. Bushing 47 is modified in order to remove any undesirable play or adjustability in the leveling device that was discovered by the inventors when a rubber insert was used. Rod 84 is placed within the opening in pillow block 46 and secured to forcer plate 58. While forcer 50 traverses platen 52 and bearings 26 slide on rails 28, cutter 3a shifts to a desired position. Rod 84 in conjunction with pillow block 46, act to retain the uniform air gap 51 by substantially removing any rotation of forcer 50 about the longitudinal axis of platen 52. For example, commonly, rotation is caused by the play between bearings 26 and rail 28 due to the mechanical tolerances between the bearings 26 and the rails 28. It is most important that air gap 51 must be uniform throughout the interface between platen 52 and forcer 50. Otherwise, motor 48 will not operate because forcer 50 will bind against platen 52.

On the lower end of carriage plate 18, cutting head mounts 40 are rigidly attached by bolt fasteners 41 in threaded holes 43, to stand offs 42 which are in turn rigidly attached, to carriage plate 18 by bolt fasteners 39 in threaded holes 49.

While FIG. 3 shows a cutter table 82, it is understood that in commercial operation, the preferred embodiment will be a series of rollers 81 similar to the one already shown which will replace rollers 80. Glass 4 leaving the annealing lehr will come across rollers 81 and be fed into apparatus 2.

Along legs 8 (as shown in FIG. 2), brackets 114, which are attached to legs 8, support one end of actuators 44 through thrust washer 54 and pivot pin 32 (FIG. 3). Because both actuators 44 perform the same function and are constructed the same, only one actuator 44 will be discussed. The other end of actuator 44 has rod 106 with hole 112. Located within hole 112 is pivot rod 110. Located on beam 6 is pivot plate 108 which has slot 113. Rod 110 interacts with hole 112 and slot 113 to provide a pivot point.

Actuator 44 lifts beam 6, such that beam 6 pivots on pivot 12, in order that cutters 3a can be raised for servicing. It is understood, of course, that cutter 3 has a conventional mechanism (not shown) in engagement with cutters 3a which in a known way engages and disengages the cutting wheels of 3a with or away from the glass for scoring or relocation purposes, respectively. The pivotal nature of beam 6 is a convenience which allows the system to be more easily serviced.

On a side of beam 6, opposite cutters 3a, is hinge 10, which is rigidly mounted to beam 6. Hinges 10 are on both ends of beam 6, adjacent beam legs 8, but only one hinge 10 will be discussed because they both perform the same function and are constructed the same. Hinge 10 is provided with pivot 12 which fits in hole 13 in pillow block 14, and allows beam 6 to pivot about pivot 12. Pillow block 14 is attached to beam 6 by fastener bolts 92. Hinge 10 is fastened to beam 6 by bolt fasteners 11.

On top of beam 6 are located cable platform supports 100 which support cable platform 36. Each cutter 3a has its own individual track 96, so only one track 96 will be described, because all tracks 96 are the same. Supports 100 are secured to beam 6 and platform 36, preferably by bolt fasteners 101. Platform 36 provides support for cable tracks 96 as cutters 3a traverse along beam 6. Tracks 96 are preferably made of plastic and are secured to carriage plate extension 20 and carriage plate extension trees 34. In this way, tracks 96 are rigidly secured to beam 6 and thus, no undesirable vibrations are experienced by tracks 96.

Electrical terminal enclosure box 98 is secured to the other side of extension 20. Each cutter 3a has its own individual box 98, so only one box will be described. Box 98 contains all electrical leads (not shown) from cutter 3a and from tracks 96. Box 98 provides an easy access to those leads, and keeps the leads from getting tangled in cutter 3a or tracks 96, as cutter 3a traverse beam 6.

In operation, as the glass is continually being formed, the operator inputs commands, through keyboard 118, such as the desired position of each cutter 3a. The commands are processed in any well-known, conventional central processing unit (CPU) 115. These commands are fed through leads 120 to terminal enclosure box 98 and, ultimately, to cutters 3a. These commands will cause cutters 3a to traverse linear rail 28 and platen 52 to the specified location and will raise or lower cutter 3a, with respect to the cutting deck which in commercial practice will comprise a series of rollers 81 rather then the table 82 as shown. An air source (not shown) is activated by CPU 115 to interact with motor 48 in order to provide the necessary air gap 51. Once the positioning of the cutters is completed, cutters 3a are usually positioned at an equal distance from one another. However, they can also be positioned at various distances from one another, depending upon the customer's needs.

If the apparatus 2 malfunctions, for example, due to a breakdown in CPU 115 or forcer 50, cutters 3a can also be manually positioned by disengaging motor 48 while keeping the air source engaged. The air source is needed to provide the desired air qap 51. Forcer 50 is then manually traversed along platen 52 to the desired position.

Once cutters 3a are in position, the cutter wheels (not shown) contact glass sheet 4 and score sheet 4 as it is fed by drive roller 81. Sheet 4 is then further advanced to a conventional station 1″ where the scored sheet is broken in a conventional manner into plates 117 of desired sizes and sent by a conveyor (not shown) to a manual packaging station 1′.

When the desired number of panes are cut, cutters 3a may be, but do not necessarily have to be, returned to their respective home positions, These home positions being shown in FIG. 2. If, for example, the operator wants only those cutters 3a located on the right hand side of apparatus 2 as viewed in FIG. 2, to return home, a command is input into CPU 115 and cutters 3a begin to return along platen 52 at a predetermined rate of speed. The return rate of speed is part of the command input into CPU 115 when the operator desires cutters 3a to return home. Once arm 21 on cutter 3a passes inductive proximity switch 22, switch 22 causes cutter 3a to stop. By this time, arm 21 is located just to the right of switch 22, if the operator were viewing the apparatus from the front as in FIG. 2. The direction of travel of cutter 3a is then reversed so that cutter 3a slowly traverses platen 52. However, this time, cutter 3a slowly moves to the left, such that arm 21 is located substantially over switch 22, and switch 22 sends a signal back to CPU 115 that cutter 3a is in its home position. This procedure is completed for all cutters 3a until they are in their respective home positions. The homing apparatus provides a quick and accurate method of homing cutter 3a, while not introducing any adverse electrical or magnetic fluxes or burdensome weight.

Once given the above disclosure, many other features, modifications and improvements will become apparent to the skilled artisan. Such features, modifications and improvements are, therefore, considered to be a part of this invention, the scope of which is to be determined by the following claims.

We claim:

1. A positioning apparatus for use in cutting glass produced in a continuous flow process, comprising:
   a base plate with first and second sides;
   a rail means rigidly attached to said first side of said base plate;
   a first carriage means secured to said rail means, such that said carriage means slides along said rail means;
   a second carriage means with first and second sides rigidly attached to said first carriage means;
   a linear step motor means, comprising:
      a linear platen, a forcer and an air gap therebetween, said motor means rigidly attached to said first side of said base plate, such that said motor means is located adjacent to said rail means, and said platen is rigidly attached to said base plate;
   means to prevent binding betweein said platen and said forcer connected to said second carriage means and said forcer, such that said means to prevent said binding interacts with said motor means, thereby to provide a uniform air gap between said platen and said forcer; and
   a cutting means removably attached to said second carriage means.

2. The apparatus according to claim 1, further comprising a position determining means located on said base plate and said second carriage means.

3. The apparatus according to claim 2, wherein said position determining means comprises an inductive proximity switch.

4. The apparatus according to claim 1, further comprising:
   means to raise said cutting means.

5. The apparatus according to claim 3, wherein said means to raise is comprised to an actuator.

6. The apparatus according to claim 1 or 2, further comprising:
   means to feed said material to said cutting means.

7. The apparatus according to claim 1 or 2, wherein said cutting means scores said material.

8. The apparatus according to claims 1 or 2, wherein said means to prevent binding between said platen and said forcer comprises a flange bearing, and a plate means attached to said forcer, whereby said flange bearing contacts said plate means.

9. A cutting apparatus for use in cutting glass produced in a continuous flow process, comprising:
   a base plate;
   a rail means rigidly attached to said base plate;
   a first carriage means secured to said rail means, such that said carriage means slides on said rail mean;
   a second carriage means rigidly attached to said first carriage means;
   a linear step motor means; comprising:
      a linear platen, a forcer and an air gap therebetween, said motor means rigidly attached to said base plate, such that said motor means is located adjacent to said rail means, and said platen is rigidly attached to said base plate;
   means to prevent binding between said platen and said forcer connected to said second carriage means and said forcer, such that said means to prevent binding interacts with said motor means, thereby to provide a uniform air gap between said platen and said forcer;
   a cutting means removably attached to said second carriage means; and
   a positioning means located on said base plate and said second carriage means.

10. An apparatus according to claim 9, wherein said means to prevent binding between said platen and said forcer comprises a flange bearing and a plate between attached to said forcer, whereby said flange bearing contacts said plate means.

11. The apparatus according to claims 9 or 10, wherein said cutting means scores said material.

12. An apparatus according to claims 9 or 10, wherein said position determining means comprises an inductive proximity switch.

* * * * *